Oct. 8, 1935.   H. C. FIEGE   2,016,856
CABLE CLAMP
Filed May 7, 1934   2 Sheets-Sheet 1
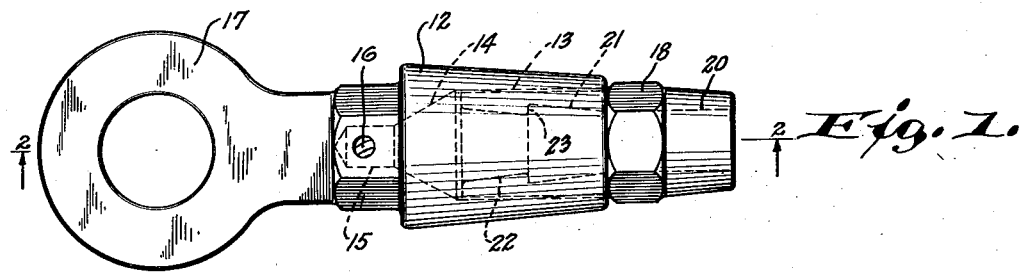
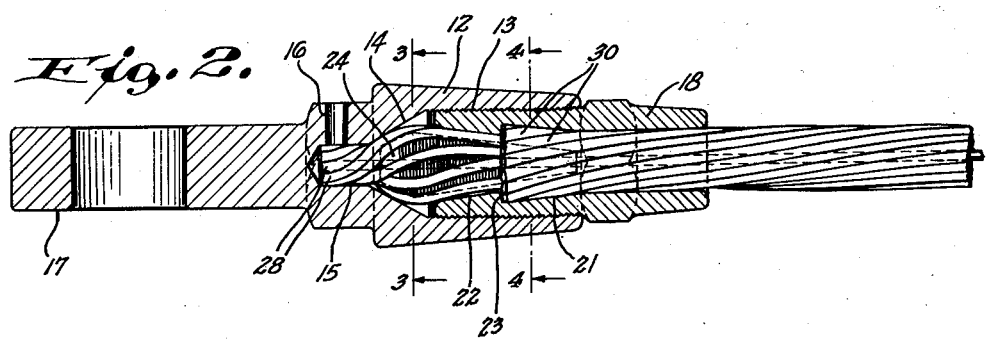
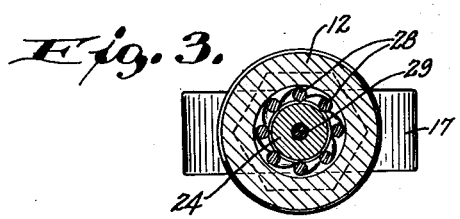
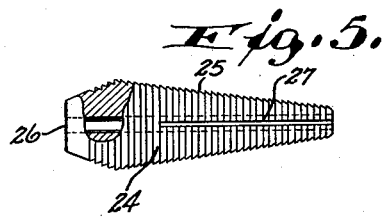
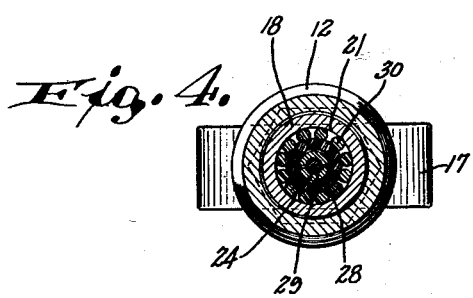
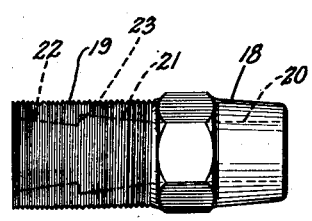
INVENTOR.
Henry C. Fiege
BY
ATTORNEYS Oct. 8, 1935.   H. C. FIEGE   2,016,856
CABLE CLAMP
Filed May 7, 1934   2 Sheets-Sheet 2
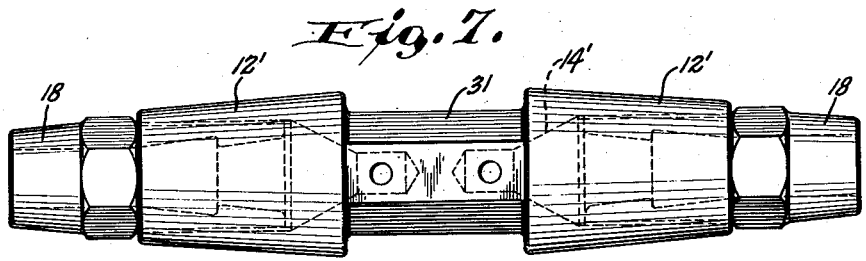
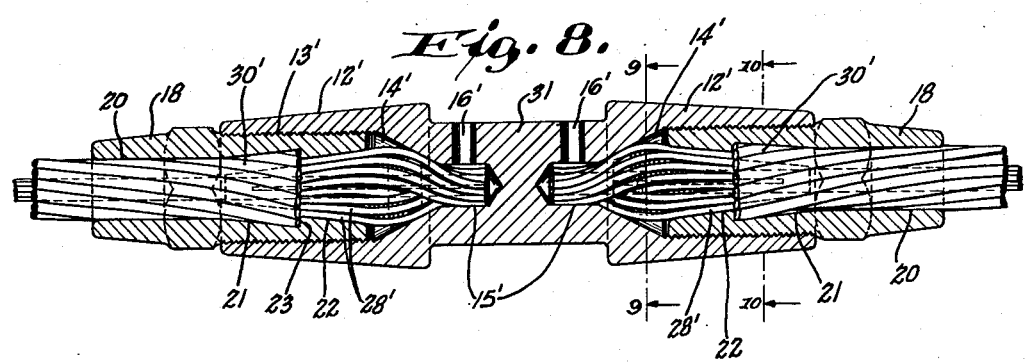
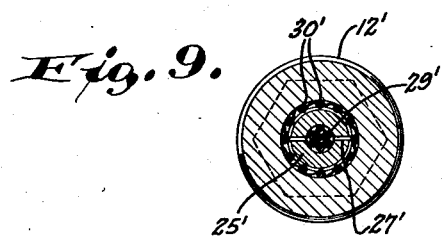
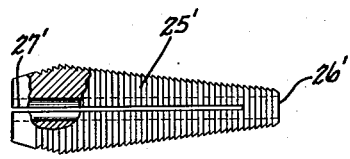
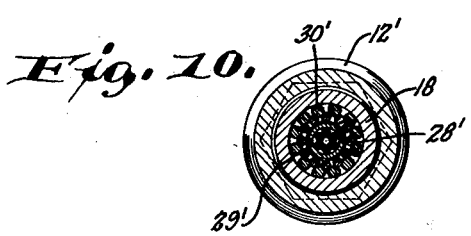
INVENTOR.
Henry C. Fiege
BY
Morsell, Kuhnen & Morsell
ATTORNEYS.

Patented Oct. 8, 1935

2,016,856

UNITED STATES PATENT OFFICE 2,016,856

CABLE CLAMP

Henry C. Fiege, Green Bay, Wis.

Application May 7, 1934, Serial No. 724,297

7 Claims. (Cl. 24—126)

This invention relates to improvements in cable fittings.

Cables are frequently formed of multiple strands of wire, the inner strands or core being composed of one type of material and the outer strands being wound spirally around the core and being formed of a different material. This type of cable is used particularly in electrical power transmission, and the core is composed of steel or other metal having high tensile strength to support the suspension load; and the outer strands are formed of copper or other material of high electrical conductivity to carry the current, this latter type of material, however, being relatively malleable and not strong.

Heretofore, the ends of cables of this type have been looped thru an aperture in an insulator or the like and the portions of the loop secured together by U-shaped clamping members extending at right angles to the cable. This type of connection is highly objectionable, as the clamping member forms an obstruction to the current passing thru the cable and is likely to cause dangerous arcing.

The cable clamp shown in my prior Patent No. 1,855,227 is not suitable for use in connection with this type of combination cable for the reason that the gripping action would take place on the outer strands, which are so malleable that a good clamping effect could not be obtained. It was therefore necessary to provide a fitting which would effectively clamp the inner or stronger strands while so acting on the outer strands as to provide for a good electrical contact between said strands and the fitting.

It is therefore an object of the present invention to provide a cable fitting particularly adapted to solve the above problem.

A further object of the invention is to provide a cable fitting so formed as to cooperate with an end of a cable of the above-mentioned type when the outer strands of the cable are cut to terminate short of the inner strands.

A more specific object of the invention is to provide a cable fitting composed of a pair of recessed clamping members and a wedging element within said recesses, one of said clamping members having the walls of its recesses formed with successive, like-tapered portions separated by a shoulder, said clamping members being movable with respect to one another to cause the wedging element to clamp one set of strands of a combination cable against one of said tapered portions, and another set of strands against the other tapered portion.

A further object of the invention is to provide a cable fitting as above-described, which is of streamlined design and formed of non-ferrous electrical conducting material, to effectively prevent arcing and therefore provide for good passage of current therethru.

A further object of the invention is to provide a cable fitting which can be quickly attached with ordinary labor in the field and which does not require the use of a flame for heating metal to effect a connection.

A further object of the invention is to provide a cable fitting which is simple in construction, neat in appearance, strong and durable, and well adapted for the purpose described.

With the above and other objects in view, the invention consists of the improved cable fitting and all its parts and combinations as set forth in the claims and all equivalents thereof.

In the accompanying drawings, in which the same reference numerals designate the same parts in all of the views:

Fig. 1 is a plan view of one form of the improved fitting;

Fig. 2 is a longitudinal, sectional view, taken on line 2—2 of Fig. 1, showing the strands of a combination cable in position therein;

Fig. 3 is a cross-sectional view, taken on line 3—3 of Fig. 2;

Fig. 4 is a cross-sectional view, taken on line 4—4 of Fig. 2;

Fig. 5 is a plan view of the wedging element;

Fig. 6 is a plan view of the inner clamping member;

Fig. 7 is a plan view of another form of fitting;

Fig. 8 is a longitudinal, sectional view, taken thru said form;

Fig. 9 is a cross-sectional view, taken on line 9—9 of Fig. 8;

Fig. 10 is a cross-sectional view, taken on line 10—10 of Fig. 8; and

Fig. 11 is a plan view of a modified form of wedging element.

Referring more particularly to Figs. 1-6 inclusive, of the drawings, showing one form of fitting, it will be seen that the numeral 12 designates an outer clamping member having one end formed with a threaded bore 13 which joins an inner threaded conical recess 14. A smaller recess 15 extends inwardly from the end of the conical recess, and an inspection opening 16 may extend from the exterior of the member 12 to said smaller recess 15.

The other end of the clamping member 12 may be formed with an eye 17 to facilitate connection of the cable end to a support.

The inner clamping member 18 (see Fig. 6) has external threading 19 on one end portion thereof and is adapted to be threaded into the outer clamping member 12. Said inner clamping member has a bore 20 which communicates with an outer tapered recess portion 21 forming an auxiliary clamping surface and with an inner tapered recess portion 22 forming a main clamping surface, the said two tapered recess portions being separated by a shoulder 23.

A wedging element 24 (see Fig. 5), which is substantially a double cone in shape, is positionable within the recesses or bores of the two clamping members in the manner shown in Fig. 2. Said element is formed with a plurality of circumferential teeth 25 and with a longitudinal bore 26. It is also slit, as at 27, for approximately two-thirds of its length.

The form of the invention just described, with the form of wedging element shown in Fig. 5, is particularly adapted for use in holding a combination cable wherein the inner strands 28, usually those of steel having high tensile strength, are formed in a group surrounding a single center strand 29 of similar material, said strands 28 and 29 forming the core.

In use, the outer strands 30, or those of high electrical conductivity and low tensile strength, are cut so as to terminate short of the ends of the inner strands, as shown in Fig. 2; and the cable end is then inserted in the bore of the inner clamping member 18 until the ends of the strands 30 abut the shoulder 23 in the manner shown in Fig. 2, the other strands 28 and 29 projecting thru the end of the clamping member 18; and the strands 28 are broomed out around the center strand 29. This strand is then inserted in the bore 26 of the wedging element 24, and the wedging element is driven into the bore of the clamping member until the strand 29 projects substantially beyond the wider end of the wedging element. The other strands 28 of the core will be distributed around the exterior of the wedging element, and the wedging element is inserted sufficiently far into the end of the cable so that the outer strands 30 also surround the smaller end portion of the wedging element, as shown in Fig. 2. Next the outer clamping member 12 is threaded on the exterior of the inner clamping member 24, and the two parts are tightened with respect to one another to cause the wedging element to be driven still farther into the cable end and to cause the extreme ends of the strands 28 to be twisted within the small recess 15. Thus said strands, which are of strong tensile strength, are simultaneously wedged between the wedging element and the tapered surface 22; and the outer ends are twisted beyond the end of the wedging element within the recess 15 to effect a positive and unusually secure clamping action. At the same time, the smaller end of the wedging element has caused the ends of the strands 30, which conduct the electricity, to be wedged tightly against the tapered portion 21 to thereby afford a good electrical connection between the ends of said strands 30 and the fitting, the said fitting being formed preferably of non-ferrous material possessing a high degree of electrical conductivity.

From the above it will be seen that due to the use of the successive tapered portions 21 and 22 in the clamping member 18 that the fitting will act to simultaneously cause a secure clamping action to take place on the high tensile strength core wires 28 and a wedging action to take place on the outer or current-carrying wires 30, so that the latter will make a good electrical contact with the fitting.

Referring more particularly to Figs. 7–11 inclusive, it will be seen that this type of fitting is particularly designed to effect a good electrical connection between the ends of two combination cables. Accordingly, the outer clamping member 31 is double in structure and formed at each end with clamping members 12', each having interior structure identical to the clamping member 12 heretofore described.

The same inner clamping member 18 is employed to cooperate with each of the outer clamping portions 12'.

In this form of the invention a slightly different form of combination cable is illustrated, wherein there are outer strands 30' of high electrical conductivity and inner strands 28' of high tensile strength surrounding a group of other strands 29' instead of the single strand 29 shown in the first form of the invention. Where this group of strands 29 is present, a slightly modified form of wedging element 25' is employed (see Fig. 11), wherein the slit 27' extends inwardly from the larger end and wherein the bore 26' is of greater diameter for receiving the group of wires 29' instead of the single strand.

As may be readily seen from Fig. 8, the clamping action takes place in an identical manner to that heretofore described in connection with Fig. 2.

While the invention is particularly adapted for use in connection with combination cables wherein the outer strands are of material possessing high electrical conductivity and the inner strands are of material possessing high tensile strength, it may be used in connection with any type of combination cable having inner and outer strands of different characteristics.

In view of the fact that combination cables are used in connection with the laying of depth bombs and mines; in connection with providing communication from observation balloons to the ground; and in many other types of work, it may be seen that this type of fitting will have broad application.

Altho only two forms of the invention have been shown and described, it is obvious that various modifications may be made without departing from the spirit of the invention; and it is to be understood that all of such modifications are contemplated as may come within the scope of the claims.

What I claim as my invention is:

1. A fitting for the end of a cable comprising a pair of clamping members having cooperating recesses therein, one of the clamping members having a bore communicating with the recesses thru which the frayed end of the cable is inserted, and the wall of the recess of said member being formed with a main clamping surface and an auxiliary clamping surface offset therefrom, a wedging element positionable in the recesses of said two members, said clamping members being movable with respect to one another to cause the wedging element to clamp part of the cable against the main clamping surface and against part of the auxiliary clamping surface.

2. A fitting for the end of a cable comprising a pair of clamping members having cooperating recesses therein, one of the clamping members having a bore communicating with the recesses thru which the frayed end of the cable is inserted, and the wall of the recess of said member being formed with a main tapered clamping surface and an auxiliary tapered clamping surface offset therefrom, a wedging element positionable in the recesses of said two members, said clamping members being movable with respect to one another to cause the wedging element to clamp part of the cable against the main clamping surface and against part of the auxiliary clamping surface.

3. A fitting for the end of a combination cable having inner strands and outer strands which terminate short of the inner strands comprising a pair of clamping members having cooperating recesses therein, one of the clamping members having a bore communicating with the recesses thru which a frayed end of the cable is inserted, and the wall of the recess of said member being formed with successive, like-tapered portions, a wedging element positionable in the recesses of said two clamping members, said clamping members being movable with respect to one another to cause the wedging element to clamp the short outer strands against one of said tapered portions and the inner strands against the other of said tapered portions.

4. A fitting for the end of a combination cable having inner strands and outer strands which terminate short of the inner strands comprising a pair of clamping members having cooperating recesses therein, one of the clamping members having a bore communicating with the recesses thru which a frayed end of the cable is inserted, and the wall of the recess of said member being formed with successive, like-tapered portions, a substantially conical wedging element positionable in the recesses of said two clamping members, said clamping members being movable with respect to one another to cause the wedging element to clamp the short outer strands against one of said tapered portions and the inner strands against the other of said tapered portions.

5. A fitting for the end of a combination cable having inner strands and outer strands which terminate short of the inner strands comprising a pair of clamping members having cooperating recesses therein, one of the clamping members having a bore communicating with the recesses thru which a frayed end of the cable is inserted, and the wall of the recess of said member being formed with successive, like-tapered portions, there being a shoulder formed between said two tapered portions, a wedging element positionable in the recesses of said two clamping members, said clamping members being movable with respect to one another to cause the wedging element to clamp the short outer strands against one of said tapered portions with the ends abutting said shoulder and the inner strands against the other of said tapered portions.

6. A fitting for the end of a combination cable having inner strands and outer strands which terminate short of the inner strands comprising a pair of clamping members having cooperating recesses therein, one of the clamping members having a bore communicating with the recesses thru which a frayed end of the cable is inserted, and the wall of the recess of said member being formed with successive offset portions separated by a shoulder, a wedging element positionable in the recesses of said two clamping members, said clamping members being movable with respect to one another to cause the wedging element to clamp the short outer strands against one of said offset portions with the ends abutting the shoulder and the inner strands against the other of said offset portions.

7. A fitting for the end of a combination cable having inner strands and outer strands which terminate short of the inner strands comprising a pair of clamping members having cooperating recesses therein, one of the clamping members having a bore communicating with the recesses thru which a frayed end of the cable is inserted, and the wall of the recess of said member being formed with successive, like-tapered portions, a wedging element positionable in the recesses of said two clamping members and having a longitudinal bore, said clamping members being movable with respect to one another to cause the wedging element to clamp the short outer strands against one of said tapered portions and part of the inner strands against the other of said tapered portions, one or more of said inner strands being received by the longitudinal bore of the wedging element.

HENRY C. FIEGE.